United States Patent
Shah et al.

(10) Patent No.: US 11,328,376 B2
(45) Date of Patent: May 10, 2022

(54) METHOD, SYSTEM, AND NON-TRANSITORY COMPUTER-READABLE MEDIUM FOR AGGREGATING, ACCESSING, AND TRANSACTING A PLURALITY OF BUSINESS APPLICATIONS

(71) Applicant: Tata Consultancy Services Limited, Mumbai (IN)

(72) Inventors: Viral Prakash Shah, Mumbai (IN); Annie Dhairiamani, Mumbai (IN); Santosh Dharamanna Kusanale, Mumbai (IN); Sachin Bhardwaj, Mumbai (IN); Stuti Shukla, New Delhi (IN)

(73) Assignee: Tata Consultancy Services Limited, Mumbai (IN)

( * ) Notice: Subject to any disclaimer, the term of this patent is extended or adjusted under 35 U.S.C. 154(b) by 227 days.

(21) Appl. No.: 15/884,603

(22) Filed: Jan. 31, 2018

(65) Prior Publication Data
US 2019/0130509 A1 May 2, 2019

(30) Foreign Application Priority Data
Nov. 1, 2017 (IN) .............................. 201721038948

(51) Int. Cl.
*G06Q 30/00* (2012.01)
*G06Q 50/18* (2012.01)
(Continued)

(52) U.S. Cl.
CPC ........... *G06Q 50/184* (2013.01); *G06Q 10/06* (2013.01); *G06Q 30/0625* (2013.01);
(Continued)

(58) Field of Classification Search
None
See application file for complete search history.

(56) References Cited

U.S. PATENT DOCUMENTS 8,275,672 B1 * 9/2012 Nguyen ............. G06Q 20/1235
705/26.41
9,268,562 B1 * 2/2016 Mangtani .................. G06F 8/71
(Continued)

FOREIGN PATENT DOCUMENTS

CA 2443665 10/2002

OTHER PUBLICATIONS

Chang, Shih-Fang, Application Marketplace as a Service—A Reference Architecture for Application Marketplace Service, Nov. 1, 2010, 2010 International Conference on P2P, Parallel, Grid, Cloud, and Internet Computing, pp. 186-192 (Year: 2010).*

*Primary Examiner* — Jeffrey A. Smith
*Assistant Examiner* — Timothy J Kang
(74) *Attorney, Agent, or Firm* — Finnegan, Henderson, Farabow, Garrett & Dunner, LLP

(57) ABSTRACT

A system and method for aggregating, accessing and transacting a plurality of business application has been described. The system is a conglomeration of the plurality of business applications which provide point solutions to everyday problems of small and medium businesses. The system allows the business application owners to register their business application on the platform. Further the system enables business owners to browse, view details, avail demos and purchase subscriptions to the business applications on the platform. The system further enables business application owners to provide a sales and access point to a wider business customer audience through a one stop shop for the plurality of business applications.

9 Claims, 5 Drawing Sheets

(51) Int. Cl.
*G06Q 30/06* (2012.01)
*G06Q 10/06* (2012.01)

(52) U.S. Cl.
CPC ..... *G06Q 30/0633* (2013.01); *G06Q 30/0635* (2013.01); *G06Q 30/0641* (2013.01)

(56) References Cited

U.S. PATENT DOCUMENTS

| | | | |
|---|---|---|---|
| 10,089,676 B1* | 10/2018 | Gupta | G06Q 30/0633 |
| 2003/0004882 A1* | 1/2003 | Holler | G06F 8/65 |
| | | | 705/51 |
| 2012/0197765 A1 | 8/2012 | Kim et al. | |
| 2013/0019007 A1* | 1/2013 | Mukunthu | G06Q 30/0201 |
| | | | 709/224 |
| 2013/0205196 A1 | 8/2013 | Han et al. | |
| 2014/0047413 A1* | 2/2014 | Sheive | G06F 8/30 |
| | | | 717/110 |
| 2015/0095923 A1* | 4/2015 | Sarid | G06F 8/30 |
| | | | 719/328 |
| 2015/0356590 A1* | 12/2015 | Posadas | G06Q 30/0226 |
| | | | 705/14.27 |
| 2016/0132806 A1* | 5/2016 | To | G06Q 10/06313 |
| | | | 705/7.23 |

\* cited by examiner

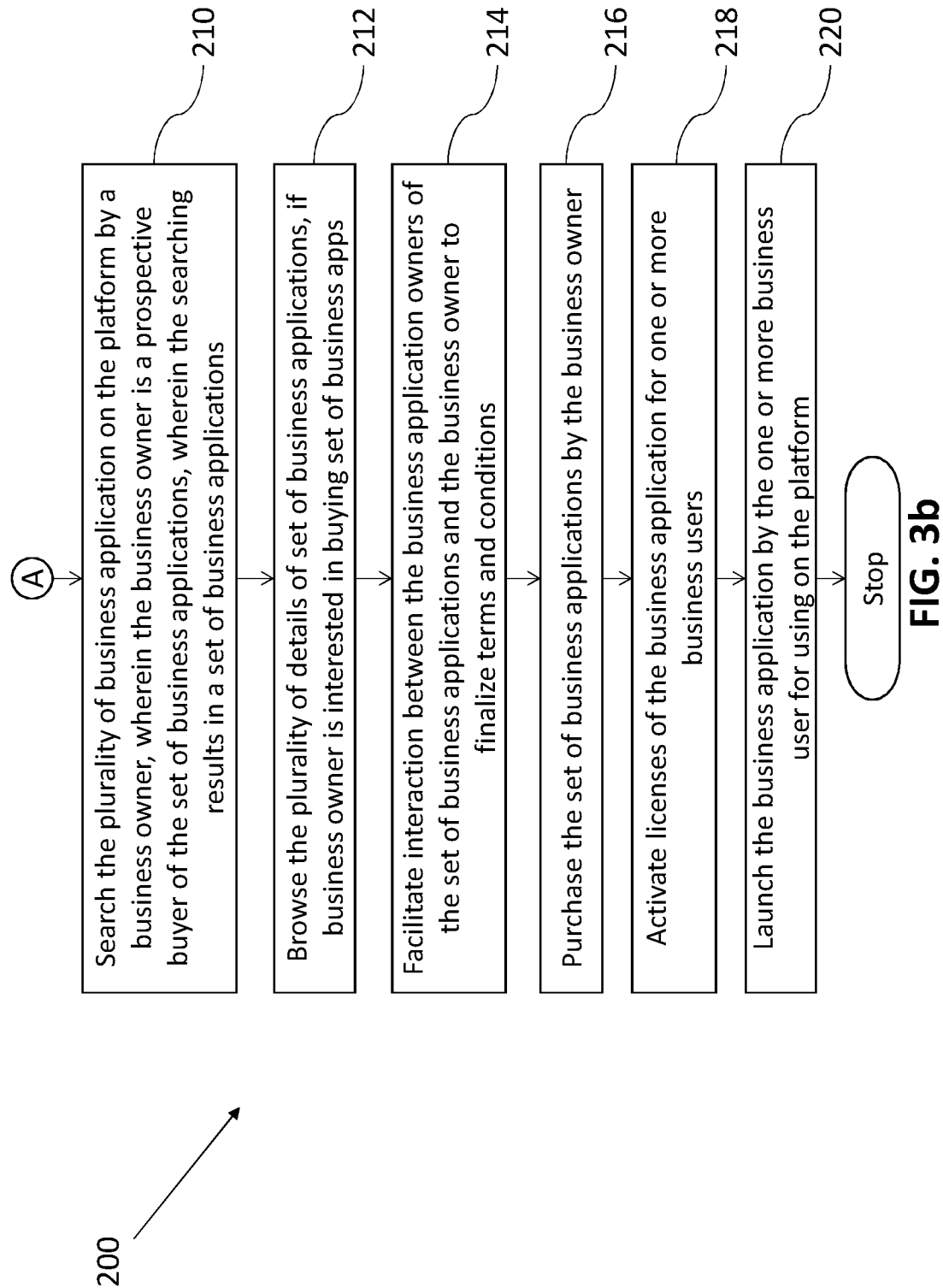

METHOD, SYSTEM, AND NON-TRANSITORY COMPUTER-READABLE MEDIUM FOR AGGREGATING, ACCESSING, AND TRANSACTING A PLURALITY OF BUSINESS APPLICATIONS

CROSS-REFERENCE TO RELATED APPLICATIONS AND PRIORITY

The present application claims priority from Indian non-provisional specification no. 201721038948 filed on 1 Nov. 2017, the complete disclosure of which, in its entirety is herein incorporated by references.

TECHNICAL FIELD

The embodiments herein generally relates to the field of providing a marketplace or hub for a plurality of business related application, and, more particularly, to a method and system for aggregating, accessing and transacting a plurality of business applications in the marketplace.

BACKGROUND

With businesses looking at digital solutions for every problems and requirements, there are a wide variety of applications spread across online which the businesses can find out and utilize to fulfill their needs. Using applications for point solutions is especially feasible for small and medium businesses who are not looking at a full-fledged ERP solution which might handle their end to end business processes. Also, even in case of large or small-medium businesses, even if a full-fledged ERP solution has been deployed, there are often use-cases and needs which independent business applications can solve with minimal cost on time and implementation.

Many such point solutions in the form of easy to complex applications are available in the market today in a ready to use manner Finding out the right solution from a wide range of applications which would suit the business requirements is a challenge.

There are few marketplaces available in the prior art. There are various stakeholders involved in such kind of marketplaces or hubs for business related application. They may include, business application developer, business application user, a platform provider, and others. The existing platforms do not meet the demands of all stakeholders. Normally, these platforms are developed on a particular technology. To work on these platforms, an expert is required who is able to work in the particular domain on which the platform have been developed. Further, these platforms are not technology agnostic, i.e. the platforms require that the business application be developed in the same technology domain and hosted within the business platform. Support for aggregating business applications on other technology domains or hosted elsewhere is not available, thus restricting the scope of app development wanting to participate in the marketplace.

SUMMARY

The following presents a simplified summary of some embodiments of the disclosure in order to provide a basic understanding of the embodiments. This summary is not an extensive overview of the embodiments. It is not intended to identify key/critical elements of the embodiments or to delineate the scope of the embodiments. Its sole purpose is to present some embodiments in a simplified form as a prelude to the more detailed description that is presented below.

In view of the foregoing, an embodiment herein provides a system for aggregating and transacting a plurality of business applications and services. The system comprises a user interface, a platform, a memory and a processor. The user interface provides a plurality of inputs. The platform provided by a platform owner for trading the plurality of business applications and services. The processor further comprises a connector framework, a registration module, a microsite creation module, a searching module, a browsing module, an interaction module, a purchase module, a license management module, a launching module. The connector framework integrates the plurality of business applications by respective business application with the platform. The registration module registers each of the plurality of business applications by the business application owner as a product on the platform. The microsite creation module creates a microsite corresponding to the business application, wherein the microsite comprising a plurality of details of the plurality of business applications. The searching module searches the plurality of business application on the platform by a business owner, wherein the business owner is a prospective buyer of the set of business applications, wherein the searching results in a set of business applications. The browsing module assists the business owner for browsing the plurality of details of the set of business applications, if the business owner is interested in purchasing the set of business applications. The interaction module facilitates interaction between the business application owners of the set of business applications and the business owner to finalize terms and conditions. The purchase module facilitates the business owner for purchasing the set of business applications. The license management module activates license of the business application for one or more business users. The launching module launches the business application by the one or more business user for using on the platform.

In another aspect the embodiment here provides a method for aggregating and transacting a plurality of business applications and services. Initially, a platform is provided by a platform owner for trading the plurality of business applications and services. In the next step the plurality of business applications are integrated by respective business application owners on a connector framework of the platform. Each of the plurality of business applications are then registered by the business application owner as a product on the platform. In the next step, a microsite corresponding to the business application is created, wherein the microsite comprising a plurality of details of the plurality of business applications. The plurality of business applications are then searched on the platform by a business owner, wherein the business owner is a prospective buyer of the set of business applications, wherein the searching results in a set of business applications. The plurality of details of the set of business applications are then browsed by the business owner, if the business owner is interested in purchasing the set of business applications. In the next step, interaction is facilitated between the business application owners of the set of business applications and the business owner to finalize terms and conditions. In the next step, the set of business applications are purchased by the business owner. In the next step, licenses of the business application for one or more business users are activated. And finally, the business application is launched by the one or more business user for using on the platform.

In another embodiment, a non-transitory computer-readable medium having embodied thereon a computer program for aggregating and transacting a plurality of business applications and services. Initially, a platform is provided by a platform owner for trading the plurality of business applications and services. In the next step the plurality of business applications are integrated by respective business application owners on a connector framework of the platform. Each of the plurality of business applications are then registered by the business application owner as a product on the platform. In the next step, a microsite corresponding to the business application is created, wherein the microsite comprising a plurality of details of the plurality of business applications. The plurality of business applications are then searched on the platform by a business owner, wherein the business owner is a prospective buyer of the set of business applications, wherein the searching results in a set of business applications. The plurality of details of the set of business applications are then browsed by the business owner, if the business owner is interested in purchasing the set of business applications. In the next step, interaction is facilitated between the business application owners of the set of business applications and the business owner to finalize terms and conditions. In the next step, the set of business applications are purchased by the business owner. In the next step, licenses of the business application for one or more business users are activated. And finally, the business application is launched by the one or more business user for using on the platform.

It should be appreciated by those skilled in the art that any block diagram herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computing device or processor, whether or not such computing device or processor is explicitly shown.

BRIEF DESCRIPTION OF THE DRAWINGS

The embodiments herein will be better understood from the following detailed description with reference to the drawings, in which:

FIG. 3A-3B is a flowchart illustrating the steps involved in aggregating and transacting a plurality of business applications according to an embodiment of the present disclosure.

Figure 1:
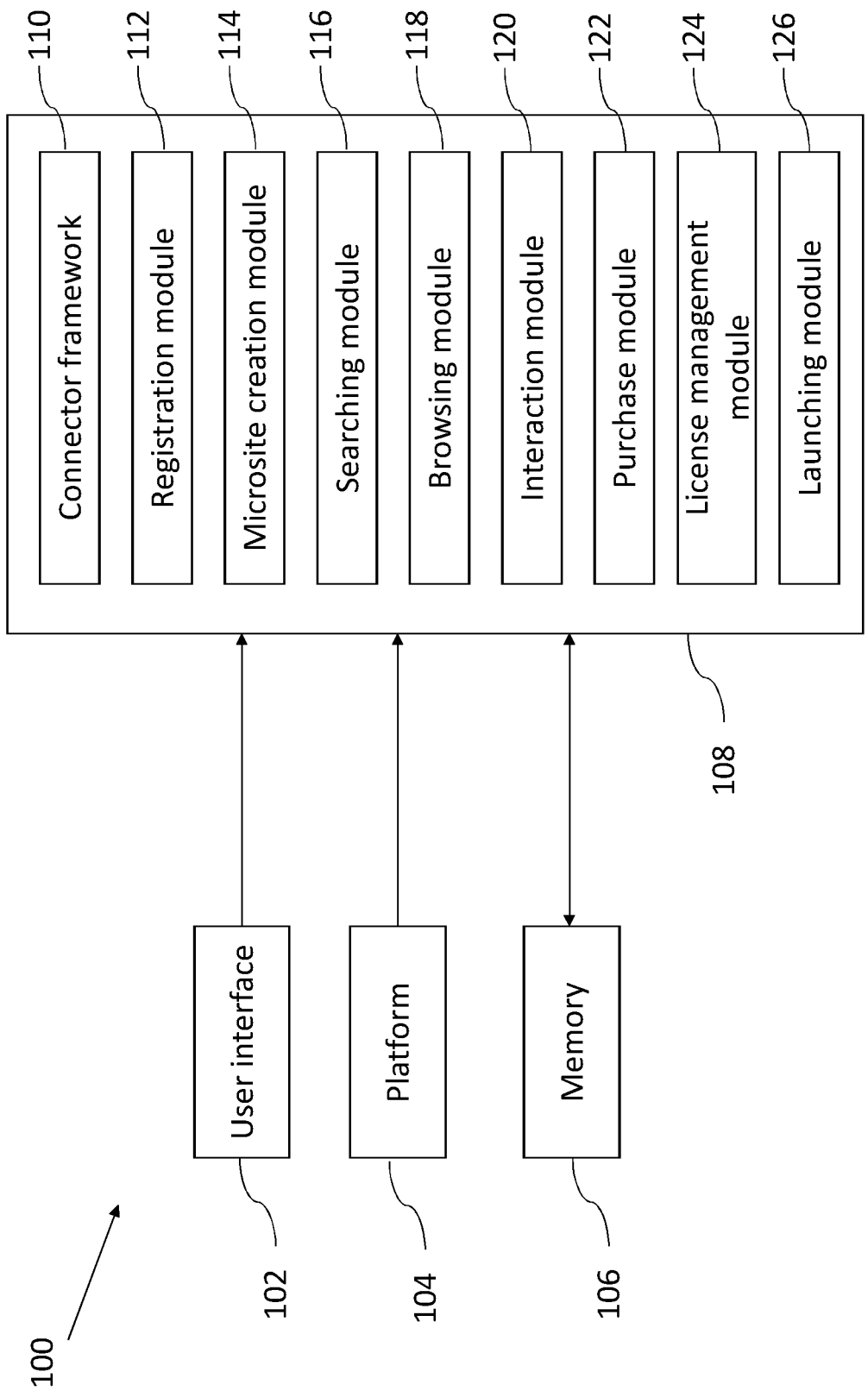
FIG. 1 illustrates a block diagram for aggregating and transacting a plurality of business applications according to an embodiment of the present disclosure.

The Figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF EMBODIMENTS

The embodiments herein and the various features and advantageous details thereof are explained more fully with reference to the non-limiting embodiments that are illustrated in the accompanying drawings and detailed in the following description. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Glossary—Terms Used in the Embodiments

The expression "business related applications" or "business applications" or "BizApps" in the context of the present disclosure refers to any business application which aims to give solutions to problems of a business or automate certain processes or any online/managed services being provided by technology owners (like helpdesk support service/technology maintenance service etc. BizApps can be created on any framework and technology.

Referring now to the drawings, and more particularly to FIG. 1 through FIG. 4, where similar reference characters denote corresponding features consistently throughout the figures, there are shown preferred embodiments and these embodiments are described in the context of the following exemplary system and/or method.

According to an embodiment of the disclosure, a system 100 for aggregating, accessing and transacting a plurality of business applications is shown in the block diagram of FIG. 1. The system 100 is a conglomeration of the plurality of business applications which provide point solutions to everyday problems of small and medium businesses. The system 100 provides a framework or hub for the plurality of business related applications in a single marketplace to enable sales, purchase and consumption in a B2B model. The plurality of applications can be custom made or tailored, simple or complex in nature. Also, the plurality of business applications may be developed on different technologies and external platforms other than in the technology or platform the system 100 exists in. They can be registered on the system 100 and opened up for sale.

According to an embodiment of the disclosure, the system 100 consists of a user interface 102, a platform 104, a memory 106 and a processor 108 as shown in the block diagram of FIG. 1. The processor 108 is in communication with the memory 106. The processor 108 is configured to execute a plurality of algorithms stored in the memory 106. The processor 108 further includes a plurality of modules for performing various functions. The plurality of modules may include, but not limited to, a connector framework 110, a registration module 112, a microsite creation module 114, a searching module 116, a browsing module 118, an interaction module 120, a purchase module 122, a license management module 124 and a launching module 126.

According to an embodiment of the disclosure the user interface 102 is configured to provide a plurality of inputs to the processor 108. The plurality of input may be search query to be inputted by the business owner for searching the business application for his/her business. In another example, any other can also be provided to the system 100. The user interface/input modules can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite.

Figure 2:
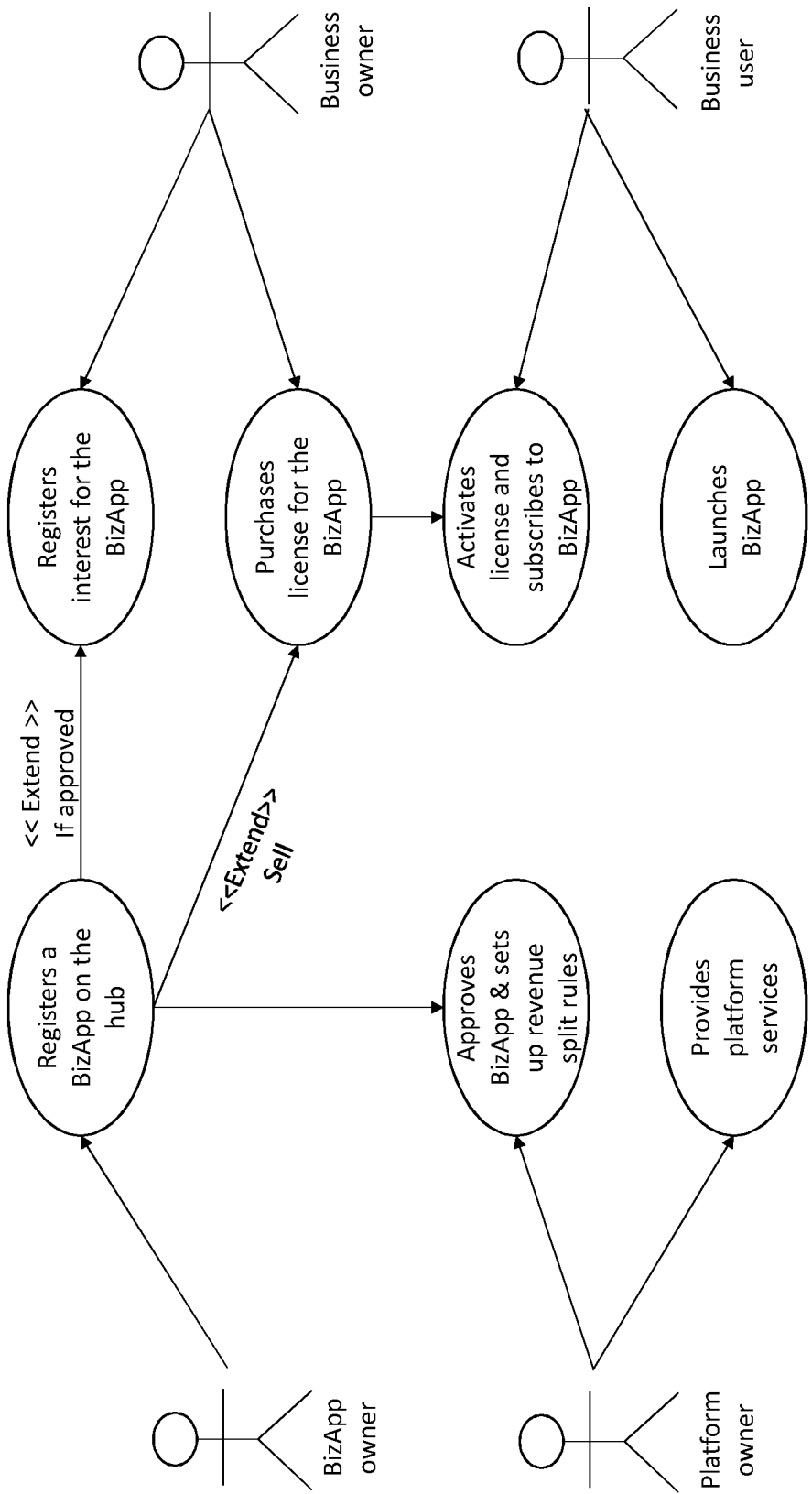
FIG. 2 shows a diagrammatic depiction of use cases of all the role players in the system according to an embodiment of the disclosure.

According to an embodiment of the disclosure, the system 100 involves four types of role players as shown in FIG. 2.

1. A platform owner: The platform owner of the system 100 is responsible for providing the platform 104 and enabling the ecosystem for the trading of the plurality of business applications and services. The platform owner is providing the platform services like user interfaces, payment gateways, revenue split management, refund processes, product creation capabilities, subscription connector systems, partner management systems and all other systems that the different users of the system 100 may require. The platform owner is also responsible for the business application product approvals and business affiliation approvals.

2. A business application owner: The business application is the provider of the business application and who is interested in selling subscriptions to his business application. The platform 104 helps different business application owners to connect their business applications to the platform 104 and enable trading for their applications thus monetizing them. The BizApps can be of any nature—simple to complex, or customizable from business to business or multi-tenanted or single instance serving multiple businesses. Also, the plurality of business applications may be developed on different technologies and external platforms other than in the technology or platform the system 100 exists in. They can be registered on the system 100 and opened up for sale. The platform 104 provides easy to integrate APIs and detailed services for one time business application setup for the App Owner.

3. A business owner: The business owner is the owner of any business whose business can use the plurality of business applications. The system 100 provides a single hub to the business owner to find, subscribe to and consume the plurality of business applications which suit their needs. The business owner can search, view details and subscribe to different BizApps under the same banner using common purchase modes for subscription. They can access and provide access to their users to different BizApps using single platform login in a login-once-access-all model. Thus, the business owner is one who is looking out for a digital solution for his requirements and is the buyer of the plurality of business applications in this B2B trade model.

4. A business user: The end consumers of the business applications are the plurality of business users who would be using the plurality of business applications for the benefit of the business. They may hold different roles in the plurality of business applications that they are consuming (e.g. Administrator, Head of department etc.). The business user gets subscribed/enrolled to the business application which his corresponding business owner has purchased licenses for by activating the licenses in the system against the business application products in the system 100. Either the business user can activate the license code for the BizApp product or the business owner can directly tag and activate license code for his users. Activation of the license triggers enrollment to the corresponding business application. This enrollment logic varies for different business applications based on the algorithm plugged into the connector framework 110. The business user also uses the same platform to access the business application in a single sign on mode.

According to an embodiment of the disclosure, the system 100 includes the connector framework 110 for integrating the plurality of business applications with the platform 104. The plurality of business applications can be integrated by the respective business application owners. The plurality of business application can be of any type and can be developed on any platform. It should be appreciated that the business application can be developed in the same technology on which the platform has been built or any other third party application. The plurality of business applications can be developed on the connector framework, a business owner's framework or a third party framework.

There are two models in which the plurality of business applications can be designed or provisioned. First, a single instance model, the single instance business application have all participating businesses in the same schema with data logically separated. These BizApps have a common branding for all users. Second, a customer specific Model, in the customer specific instance the business application, every business's data resides in customer specific schema and is thus physically separated. Branding/design of customer specific BizApps could vary based on the organization where it is being setup and configured.

Figure 4:
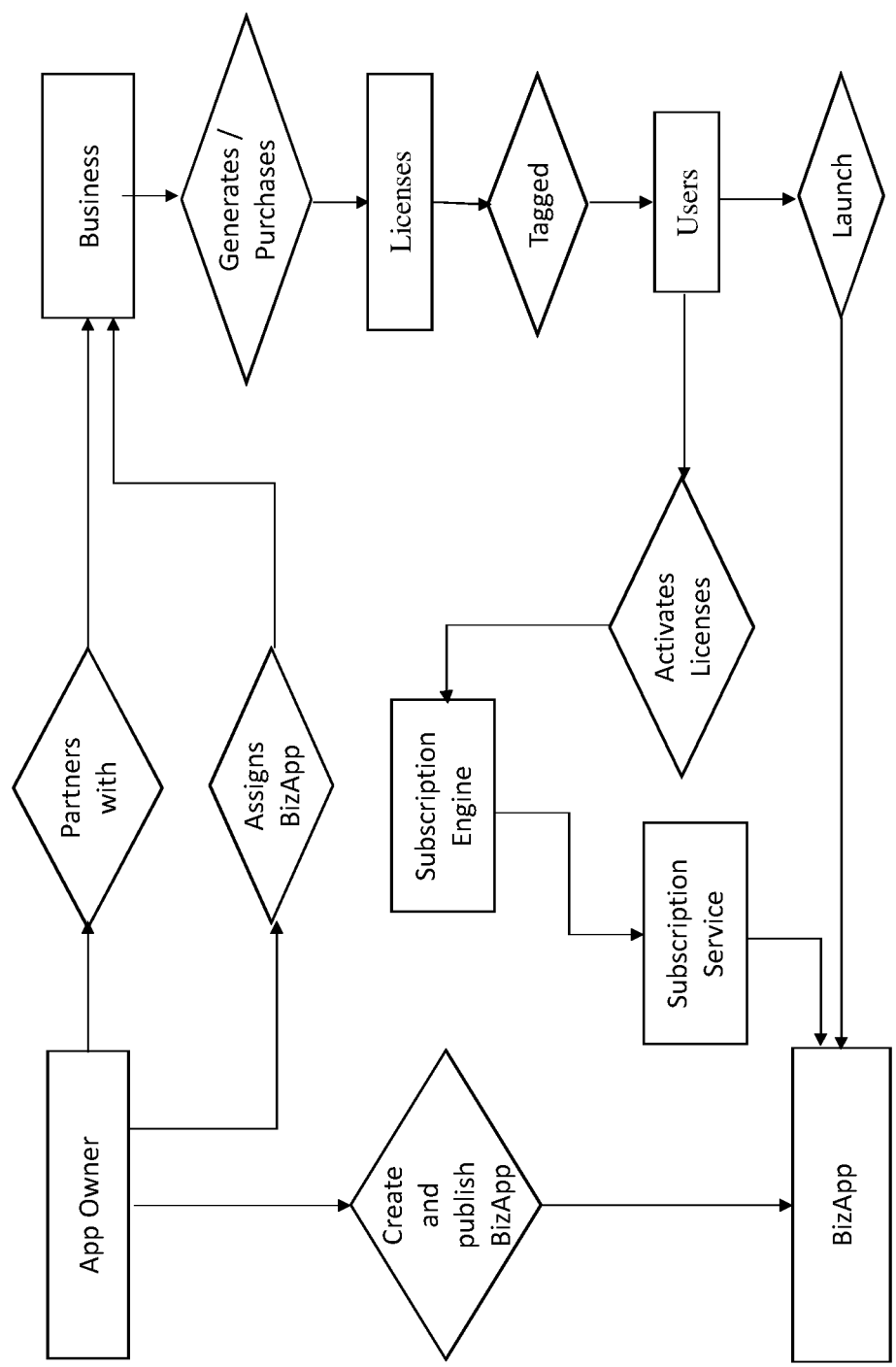
FIG. 4 shows a relationship/flow diagram between the different role players according to an embodiment of the disclosure.

In an example, the connector framework 110 can also be known as the subscription engine 110, which helps to integrate any business application to the platform 104 as shown in the flow diagram 400 of FIG. 4. There are various components of the connector framework 110 which assist in the integration of the business application as one of the services in the connector framework 110. Any new business logic or type that needs to be registered is called as a 'service'. In the context of the system 100, every business application is a new 'service'. This 'service' would contain the business logics required for subscription and un-subscription to the business application and logics to pull user specific subscription data from the business application. Subscription logic takes care of assigning the business application to the user and business setup/configuration in case this is the first user for the business who is activating the license code. Similarly, the un-subscription algorithm takes care of un-assigning or revoking access to modules of the business application.

According to an embodiment of the disclosure, everything about the 'service' is defined within a service java class. The service URL which contains the service logic (essentially a web-service) is registered in the connector framework 110. Every 'service' defines logic for two kinds of action, subscription and the un-subscription. Subscription logics handles assigning of rights/features/access to users for a user action and un-subscription logics handles access/feature revoke activities. All business application 'services' have the logic which handle user to business mapping for the business application in the right schema or connect to third party APIs/web services to process user access request based on type of business application.

According to an embodiment of the disclosure, the 'service' may have need to perform different kind of actions based on different parameters. The connector framework allows to setup these parameters and define possible values of the parameters. This is called as the 'service metadata'. These parameters are selected as part of the rule definition. The 'service metadata' can be defined through BizEForms one time for the 'service'. The BizEForms is a tool for setting up service configuration. Metadata are the attributes of the 'service' which are configured when defining a rule based on which the service should execute. The parameters thus configured are available to the 'service' class when the rule condition is satisfied and 'service' is invoked.

According to an embodiment of the disclosure, the connector framework 110 further provides rules for subscription/un-subscription. Rules in the framework allow to define what action needs to be performed for which users. This setup is done by the Platform Owner as part of business application approval process. There are 2 parts to a rule—

Action and filter. Action involves selecting the 'service' that needs to be executed, service parameters and type of action (subscription or un-subscription). Filter involves sifting out which users are eligible for the defined action constitute a filter definition. One important filter attribute that should be set up in every rule is specification of the product code for the business application that the user has purchased. Only those users who have activated license of the business application should be eligible for further action.

According to an embodiment of the disclosure, the system 100 further includes the registration module 112. The registration module 112 is configured to register each of the plurality of business applications by the business application owner as a product on the platform 104. The business application owner can define the business application to be visible on a catalogue of the system and design the information page when the business user or the business owner selects the BizApp from the catalogue. Thus, the business application owner can define two elements for his BizApp—the BizApp stamp and the BizApp Microsite. The BizApp microsite can be created using the microsite creation module 114. The microsite comprising a plurality of details of the plurality of business applications. The catalogue of the plurality of business application on the system 100 displays tiles of BizApps available for subscription/sale. These are called as the BizApp Stamps. On selection of any one of the plurality of business applications, an information page gets displayed which is called as the BizApp Microsite.

The stamp displays the name of the business application, a brief description, and thumbnail image for the App, ratings and reviews of other users and number of users subscribed. The business application is searchable using free text search and other catalogue filters like category, product type, offered by and price. The business application owner defines all these attributes as part of the BizApp setup as a product. A microsite page is also linked as part of the business application definition. This page should contain all details of the business application including how to use and demo links if required. The business users will be able to activate their licenses through an activate license/subscribe buttons placed in the microsite.

According to an embodiment of the disclosure, the platform 104 also allows to define something called as the child product whose parent product acts as a superset to a group of products which are variations/flavors of the same product. The variations could be based on pricing models or feature wise. The parent product in itself is not purchasable but is only created to group the different variations of the business application.

According to an embodiment of the disclosure, the plurality of business applications should be created as parent product if they have subscription variations based on price, type, validity etc. or if they have add-on features. In such cases, the BizApp Stamp will act as the container holding the different variations of the business application that a user can subscribe to. Each of the variations will have a unique product code. If there are no variations required, then the business application can be created as a single standalone product having a unique product code. A variation of the business application will not be visible directly under the catalogue but would be available only within the microsite of its parent to a general business user.

According to an embodiment of the disclosure, the system 100 also includes the searching module 116 and the browsing module 118. The searching module 116 searches the plurality of business application on the platform 104 based on a query inputted by the business owner. The searching results in a set of business applications. The browsing module 118 browses the plurality of details of the set of business applications, if the business owner is interested in purchasing the set of business applications.

According to an embodiment of the disclosure, the system 100 includes the interaction module 120. The interaction module 120 is configured to facilitate interaction between the business application owners of the set of business applications and the business owner. If the negotiations between the business application owners of the set of business applications and the business owner are agreed, then the purchase module 122 facilitates the business owner for purchasing the set of business applications.

According to an embodiment of the disclosure, the system 100 includes the license management module 124 and the launching module 126. The license management module 124 is configured to activate the license of the business application for one or more business users. The license management module 124 is also configured to deactivate the license of the activated business application for one or more business users. The license can be provided only for a validity period and can be deactivated post the consumption of the validity period. The launching module 126 is configured to launching the business application by the one or more business user for using on the platform 104 itself.

According to an embodiment of the disclosure, the business owner can activate licenses for the business application when the business application owner assigns the business application as shown in the flow diagram 400 of FIG. 4. In an example, the purchase module 122 is a partner management screen. The business application access is given to the business users through license code activation. One license corresponds to one business user access to the business application. Once the business application has been assigned to the business owner, it can purchase multiple licenses through online payment or offline request for generation. In case of offline purchase request, the business application owner approves the request when he receives the required amount and the requested number of licenses get generated. The licenses thus purchased can be activated by the business users to get access to the business application.

According to an embodiment of the disclosure, the business owner can also add the users to a subscribed BizApp by purchasing license codes and sharing the same with their users or activating the code directly by tagging them to the users. The license codes can be given to user in one of the 2 modes. Mode 1: Share the code offline—User receives the license code offline and punches in the code in the portal. On successful validation, subscription engine for the user will be triggered and user will be assigned the BizApp. Mode 2: The business owner can directly tag a license to the user. In this mode, the business owner can directly tag their users to the licenses. The subscription engine 110 will be triggered at this event and user will be assigned the BizApp.

According to an embodiment of the disclosure, the system 100 is also configured to provide the feature of purchasing the add-ons of the set of business applications which have been purchased by the business owner. In the context of the subscription engine 110, add-ons are nothing but providing additional features through a new rule type. The add-ons are child products of the set of business application against which a specific kind of subscription rule definition is tagged.

Assignment of add-ons is similar to the process of assigning the business application to the business owner. When the business users activate corresponding licenses for the add-ons, the subscription engine 110 will assign access to the feature/functionality to the business users.

According to an embodiment of the disclosure, the system 100 is also configured to check the validity of the license provide the feature of re-subscription of the set of business applications. Any business application subscription and user subscription to the business application can be tagged with a license which would be valid for a specific period of time. Validity of a subscription is specified at the rule level. When the time period expires, the un-subscription logic of the corresponding delivery engine will be invoked. Users will be able to renew their subscription post expiry.

Figure 3A:
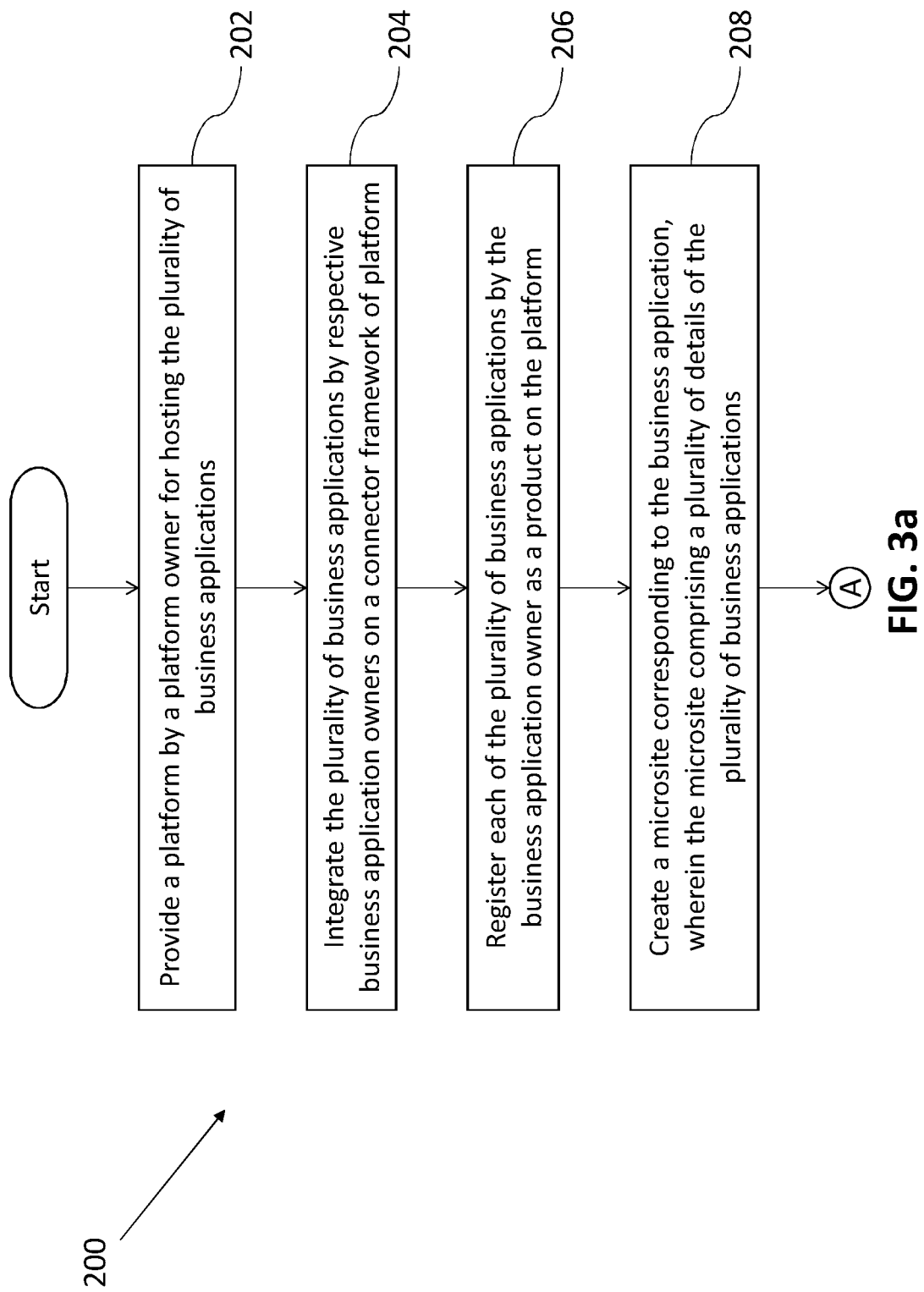

In operation, a flowchart 200 illustrating the steps involved for aggregating and transacting a plurality of business applications is shown in FIG. 3A-3B. Initially at step 202, the platform 104 is provided by the platform owner for selling the plurality of business applications. The platform owner would be responsible for providing various services of the platform such as billing, revenue sharing, payment gateway etc. In the next step 204, the plurality of business applications are integrated by the respective business application owners on the connector framework 110 of the platform 104. In an example, the connector framework 110 can also be called as the subscription engine 110.

In the next step 206, each of the plurality of business applications are registered by the business application owner as a product on the platform 104. At step 208, a microsite is created by the business application owner corresponding to the business application, wherein the microsite comprising a plurality of details of the plurality of business applications. The plurality of details may include a brief description of the business application, a thumbnail image for the business application, ratings and reviews of users and number of users subscribed.

In the next step 210, the plurality of business application are searched on the platform 104 by the business owner. The business owner is a prospective buyer of the set of business applications. The business owner can provide an input query to the search engine based on the requirement of their business. The searching results in a set of business applications. At step 212, the plurality of details of the set of business applications are then browsed by the business owner. If the set of business applications are of interest of the business then the business owner can show/register his interest in purchasing the set of business applications. In the next step 214, an interaction between the business application owners of the set of business applications and the business owner is facilitated by the system 100. The business owner and the business application owners can define and agree upon various terms and conditions. At step 216, the set of business applications can be purchased by the business owner. At step 218, the business owner then can further activate the licenses of the set of business applications to one or more business users. And finally at step 220, the business application can be launched by the business user on the platform for their use.

According to an embodiment of the disclosure, the system 100 allows the platform owner to provide a revenue sharing scheme for the business users and the platform owner. For the business users, Flat percentage discount on a business application can be configured by the business owners in the system. This system validates whether this percentage is greater than or equal to the platform revenue share percentage during configuration. It will not allow business owners to specify a discount percentage more than publisher share percentage minus maximum transaction charge percentage (what would be the maximum transaction charge would be setup at the platform payment gateway configuration) as split is initiated on the base price irrespective of the discounted rate at which the learner would have purchased the product.

Similarly for the platform owners, the business application is assigned to the platform owner for purchase at a discounted percentage by the business owners. Unlike the case of business user discount, a percentage lower than the business owner share can be set by the business owner. The products thus assigned cannot be purchased online by the platform owners and only an offline license generation request can be raised by the platform owners. When business owner approves such a request, an offline order is generated against the platform owner.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein provides a system and method for aggregating, accessing and transacting a plurality of business applications. Further, the system is a conglomeration of the plurality of business applications which provide point solutions to everyday problems of small and medium businesses. The system enables business owners to browse, view details, avail demos and purchase subscriptions to the business applications and enables business application owners to provide a sales and access point to a wider business customer audience through a one stop shop for the plurality of business applications.

It is, however to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments may include a hardware configuration of an information handling/computer system in accordance with the embodiments herein. The system herein comprises at least one processor or central processing unit (CPU). The CPUs are interconnected via system bus to various devices such as a random access memory (RAM), read-only memory (ROM), and an input/output (I/O) adapter. The I/O adapter can connect to peripheral devices, such as disk units and tape drives, or other program storage devices that are readable by the system. The system can read the inventive instructions on the program storage devices and follow these instructions to execute the methodology of the embodiments herein.

The system further includes a user interface adapter that connects a keyboard, mouse, speaker, microphone, and/or other user interface devices such as a touch screen device (not shown) to the bus to gather user input. Additionally, a communication adapter connects the bus to a data processing network, and a display adapter connects the bus to a display device which may be embodied as an output device such as a monitor, printer, or transmitter, for example.

The preceding description has been presented with reference to various embodiments. Persons having ordinary skill in the art and technology to which this application pertains will appreciate that alterations and changes in the described structures and methods of operation can be practiced without meaningfully departing from the principle, spirit and scope.

What is claimed is:

1. A method for aggregating and transacting a plurality of applications, the method comprising a processor implemented steps of:
    implementing a platform by a platform (104) owner for trading the plurality of applications, wherein the plurality of applications is developed on different technologies and external platforms other than the platform, wherein the platform provides a single instance model and a customer specific model in which a plurality of applications is developed, the single instance mode includes single instance application in same schema with data logically separated, and the customer specific model includes every data residing in physically separated customer specific schema;
    integrating the plurality of applications by respective application owners on a connector framework (110) of the platform, wherein the connector framework assists in integrating the plurality of applications through API and web services, and to perform varied kind of actions based on parameters, wherein the connector framework allows to setup values of the parameters in form of service metadata configured to define rules to execute services provided by the plurality of applications, wherein the service metadata is defined through BizE-Forms one time for the service, and wherein the rules constitute a particular action that needs to be performed for a set of users and a filter to sift out which set of users are eligible for the particular action;
    registering each of the plurality of applications by the application owner as a product on the platform;
    creating a microsite corresponding to the application, wherein the microsite comprising a plurality of details of the plurality of applications, wherein the application owner can define the microsite and at least one stamp, wherein the stamp refers to a catalogue of the plurality of applications displayed as tiles;
    searching the plurality of applications on the platform by a owner, wherein the owner is a prospective buyer of the set of applications, wherein the searching results in a set of applications, wherein the searching is performed based on keywords using free text search and catalogue filters;
    browsing the plurality of details of the set of applications, if the owner is interested in purchasing the set of applications;
    facilitating interaction between the application owners of the set of applications and the owner to finalize terms and conditions;
    purchasing the set of applications by the owner;
    activating licenses of the application for one or more users, wherein license codes are shared offline to the users for activation or the license codes are activated directly by tagging the users to the application; and
    launching the application by the one or more user for using on the platform in a single sign on mode.

2. The method of claim 1 further comprising providing subscription of the set of application to a plurality of users.

3. The method of claim 1 further comprising the step of unsubscribing the subscribed plurality of users.

4. The method of claim 1 further comprising the step of purchasing add-ons to the set of applications.

5. The method of claim 1, wherein the plurality of details comprise a brief description of the application, a thumbnail image for the application, ratings and reviews of users and number of users subscribed.

6. The method of claim 1 further comprises a licensing feature, wherein access and control to the applications is given based on a valid license.

7. The method of claim 1, wherein the platform owner further provides a one or more of the following services: a user interface, payment gateways, revenue split management, refund processes, product creation capabilities, or partner management systems.

8. A system for aggregating and transacting a plurality of applications, the system comprises:
- a user interface (102) for providing a plurality of inputs;
- a platform (104) provided by a platform owner for trading the plurality of applications, wherein the plurality of applications is developed on different technologies and external platforms other than the platform, wherein the platform provides a single instance model and a customer specific model in which a plurality of applications is developed, the single instance mode includes single instance application in same schema with data logically separated, and the customer specific model includes every data residing in physically separated customer specific schema;
- a memory (106);
- a processor (108) in communication with the memory, the processor further comprising;
  - a connector framework (110) for integrating the plurality of applications by respective application with the platform, wherein the connector framework assists in integrating the plurality of applications through API and web services, and to perform varied kind of actions based on parameters, wherein the connector framework allows to setup values of the parameters in form of service metadata configured to define rules to execute services provided by the plurality of applications, wherein the service metadata is defined through BizEForms one time for the service, and wherein the rules constitute a particular action that needs to be performed for a set of users and a filter to sift out which set of users are eligible for the particular action;
  - a registration module (112) for registering each of the plurality of applications by the application owner as a product on the platform;
  - a microsite creation module (114) for creating a microsite corresponding to the application, wherein the microsite comprising a plurality of details of the plurality of applications, wherein the application owner can define the microsite and at least one stamp, wherein the stamp refers to a catalogue of the plurality of applications displayed as tiles;
  - a searching module (116) for searching the plurality of applications on the platform by a owner, wherein the owner is a prospective buyer of the set of applications, wherein the searching results in a set of applications, wherein the searching is performed based on keywords using free text search and catalogue filters;
  - a browsing module (118) assisting the owner for browsing the plurality of details of the set of applications, if the owner is interested in purchasing the set of applications;
  - an interaction module (120) for facilitating interaction between the application owners of the set of applications and the owner to finalize terms and conditions;
  - a purchase module (122) for facilitating the owner for purchasing the set of applications;
  - a license management module (124) for activating license of the application for one or more users, wherein license codes are shared offline to the users for activation or the license codes are activated directly by tagging the users to the application; and
  - a launching module (126) for launching the application by the one or more user for using on the platform in a single sign on mode.

9. A non-transitory computer-readable medium having embodied thereon a computer program for aggregating and transacting a plurality of applications, the method comprising a processor implemented steps of:
- providing a platform by a platform (104) owner for trading the plurality of applications, wherein the plurality of applications is developed on different technologies and external platforms other than the platform, wherein the platform provides a single instance model and a customer specific model in which a plurality of applications is developed, the single instance mode includes single instance application in same schema with data logically separated, and the customer specific model includes every data residing in physically separated customer specific schema;
- integrating the plurality of applications by respective application owners on a connector framework (110) of the platform, wherein the connector framework assists in integrating the plurality of applications through API and web services, and to perform varied kind of actions based on parameters, wherein the connector framework allows to setup values of the parameters in form of service metadata configured to define rules to execute services provided by the plurality of applications, wherein the service metadata is defined through BizEForms one time for the service, and wherein the rules constitute a particular action that needs to be performed for a set of users and a filter to sift out which set of users are eligible for the particular action;
- registering each of the plurality of applications by the application owner as a product on the platform;
- creating a microsite corresponding to the application, wherein the microsite comprising a plurality of details of the plurality of applications, wherein the application owner can define the microsite and at least one stamp, wherein the stamp refers to a catalogue of the plurality of applications displayed as tiles;
- searching the plurality of applications on the platform by a owner, wherein the owner is a prospective buyer of the set of applications, wherein the searching results in a set of applications, wherein the searching is performed based on keywords using free text search and catalogue filters;
- browsing the plurality of details of the set of applications, if the owner is interested in purchasing the set of applications;
- facilitating interaction between the application owners of the set of applications and the owner to finalize terms and conditions;
- purchasing the set of applications by the owner;
- activating licenses of the application for one or more users, wherein license codes are shared offline to the users for activation or the license codes are activated directly by tagging the users to the application; and
- launching the application by the one or more user for using on the platform in a single sign on mode.

* * * * *